United States Patent
Chang et al.

(10) Patent No.: US 10,341,271 B2
(45) Date of Patent: Jul. 2, 2019

(54) METHOD, SYSTEM AND RECORDING MEDIUM FOR COMMUNICATING AND DISPLAYING CONTENT IN A MESSENGER APPLICATION

(71) Applicant: LINE Corporation, Tokyo (JP)

(72) Inventors: So Young Chang, Seongnam-si (KR); Hyun Jeong Lee, Seongnam-si (KR)

(73) Assignee: Line Corporation, Tokyo (JP)

( * ) Notice: Subject to any disclaimer, the term of this patent is extended or adjusted under 35 U.S.C. 154(b) by 38 days.

(21) Appl. No.: 14/839,258

(22) Filed: Aug. 28, 2015

(65) Prior Publication Data

US 2016/0149842 A1    May 26, 2016

(30) Foreign Application Priority Data

Nov. 26, 2014    (KR) .................. 10-2014-0166281

(51) Int. Cl.
*H04L 12/58*        (2006.01)
*G06F 3/0482*    (2013.01)

(52) U.S. Cl.
CPC .......... *H04L 51/046* (2013.01); *G06F 3/0482* (2013.01)

(58) Field of Classification Search
CPC .. G06Q 10/107; G06Q 30/0201; G06Q 30/02; G06Q 30/0202; G06Q 10/06375; G06Q 10/0639; H04L 12/585; H04L 12/58; H04L 12/581; H04L 12/5855
USPC ........................................................ 709/206
See application file for complete search history.

(56) References Cited

U.S. PATENT DOCUMENTS

| | | | |
|---|---|---|---|
| 7,921,052 B2 * | 4/2011 | Dabney | G06Q 30/08 705/35 |
| 8,943,145 B1 * | 1/2015 | Peters | G06Q 50/01 709/206 |
| 9,124,957 B1 * | 9/2015 | Fogel | H04Q 3/66 |
| 2006/0015390 A1 * | 1/2006 | Rijsinghani | G06F 17/3089 705/7.29 |
| 2007/0043605 A1 * | 2/2007 | Fisher | G06Q 10/109 705/30 |
| 2008/0088123 A1 * | 4/2008 | Jeon | A63F 3/065 283/56 |

(Continued)

FOREIGN PATENT DOCUMENTS

| | | | |
|---|---|---|---|
| JP | 2001-077921 A | 3/2001 | |
| JP | 2002-041433 A | 2/2002 | |

(Continued)

OTHER PUBLICATIONS

Mathematical Approach to Service Innovation, Chiaki Hishinuma, The Journal of the Institute of Electronics, Information and Communication Engineers, Denshi-Joho-Tsushin-Gakkai, Sep. 1, 2011, vol. 94, p. 767-772.

(Continued)

*Primary Examiner* — Mahran Y Abu Roumi
(74) *Attorney, Agent, or Firm* — Harness, Dickey & Pierce, P.L.C.

(57) ABSTRACT

In one example embodiment, a communication method includes identifying a selection instruction for content provided by a content provider, and establishing a communication link between a first account of a user and a second account of a business operator relevant to the content based on the identification of the selection instruction.

19 Claims, 13 Drawing Sheets

(56) References Cited

U.S. PATENT DOCUMENTS

| | | | |
|---|---|---|---|
| 2008/0201719 A1* | 8/2008 | Daniel | H04L 45/00 718/105 |
| 2012/0150973 A1* | 6/2012 | Barak | G06Q 30/0609 709/206 |
| 2012/0290910 A1* | 11/2012 | Kumar | G06F 17/30893 715/205 |
| 2012/0296965 A1* | 11/2012 | Srivastava | G06Q 10/107 709/204 |
| 2012/0311048 A1* | 12/2012 | Bostick | G06Q 10/107 709/206 |
| 2013/0039483 A1* | 2/2013 | Wolfeld | H04M 3/00 379/265.03 |
| 2013/0073336 A1* | 3/2013 | Heath | G06Q 30/02 705/7.29 |
| 2013/0132864 A1* | 5/2013 | Panigrahi | G06Q 10/06398 715/753 |
| 2014/0108583 A1* | 4/2014 | Kulkarni | H04L 51/046 709/206 |
| 2014/0143354 A1* | 5/2014 | Tiernan | H04L 51/04 709/206 |
| 2014/0180897 A1* | 6/2014 | Dale | G06Q 40/04 705/37 |
| 2015/0127759 A1* | 5/2015 | Siegel | H04L 51/26 709/207 |
| 2015/0149571 A1* | 5/2015 | Barak | G06Q 30/0609 709/206 |
| 2015/0319307 A1* | 11/2015 | Govindarajan | H04M 3/523 379/265.02 |
| 2016/0100057 A1* | 4/2016 | Perez | H04M 3/5133 379/266.07 |

FOREIGN PATENT DOCUMENTS

| | | |
|---|---|---|
| JP | 2002-245354 A | 8/2002 |
| JP | 2007-164581 A | 6/2007 |
| JP | 2011-065582 A | 3/2011 |
| JP | 2014-010747 A | 1/2014 |
| KR | 20010035118 A | 5/2001 |
| KR | 20070104869 A | 10/2007 |
| KR | 20120078153 A | 7/2012 |
| KR | 20130092832 A | 8/2013 |

OTHER PUBLICATIONS

Japanese Office Action dated Sep. 27, 2016 for corresponding Japanese Application No. 2015-227560.

* cited by examiner

FIG. 12

|   | Middle class | Small class |
|---|---|---|
| 1 | Pet | · Pet beauty shop / Veterinary hospital |
| 2 | Move | · Move service |
| 3 | Hospital / Clinic | · Dental / Oriental medicine / Plastic surgery / Dermatology / Ophthalmology / Obstertrics and gynecology / Psychiatry |
| 4 | Health / Beauty care | · Neil art / Massage / Beauty and hair / Skin care |
| 5 | Wedding consulting | · Wedding consulting |
| 6 | Birth / Child care service | · Postpartum care center / Postpartum helper & Playing room / Baby farm |
| 7 | School / Academy / Study | · Kindergarten / Nursery<br>· College scholastic ability test / Entrance examination / General study academy / Extracurricular lecture / Study book / Home study |
| 8 | Education support / Employment information | · Part-time job / Employment portal, Headhunter<br>· Study abroad / Language training support service |
| 9 | Event | · Event-specialized business |
| 10 | Facility management | · Golf training ground / Yoga / Dancing school / Sports complex center<br>· Culture center / Other facilities for leisure |
| 11 | Lesson / Program | · Golf / Aquatic sports / Ski / Board lesson for individual or company<br>· Culture / Leisure lesson for individual or company |
| 12 | Restaurant / Catering | · Catering<br>· Restaurant / Café / Bar |
| 13 | Lodging facility | · Condominium / Resort / Domestic lodging / Pension |
| 14 | Travel bureau | · Travel bureau |
| 15 | Clothing / Fashion accessory / Repair | · Clothing / Fashion accessory / Special clothing<br>· Clothing / Fashion accessory repair |
| ⋮ | ⋮ | ⋮ |

METHOD, SYSTEM AND RECORDING MEDIUM FOR COMMUNICATING AND DISPLAYING CONTENT IN A MESSENGER APPLICATION

CROSS-REFERENCE TO RELATED APPLICATIONS

A claim for priority under 35 U.S.C. § 119 is made to Korean Patent Application No. 10-2014-0166281 filed Nov. 26, 2014, in the Korean Intellectual Property Office, the entire contents of which is hereby incorporated by reference.

BACKGROUND

With the growth toward information-centric societies given the evolution and advancement of information and communication technologies, Internet is now mostly regarded as an essential and important medium over all of fields for conveying and obtaining information.

Even without knowledge of the address of specific websites on the Internet that may include information of interest, there exist software-based algorithms and engines for guiding a user to a desired source for information of interest on the Internet.

In the mechanism of a search engine, if a specific search word input by a user is received after storing information, which is previously gathered by traveling through many websites by a "web robot" or a search program called "spider program", in a database, a web site including the search word received from the database is provided to the user.

In the meantime, considering problems of appearance given the large number of websites for a given search word, each search website having its own search engine provides a shortcut service. For example, Korean Patent Publication No. 10-2008-0096173 (published on Oct. 30, 2008) discloses "SEARCH SERVICE PROVIDING APPARATUS AND METHOD THEREOF" related to an efficient shortcut service for a search word.

As such, along with generalization of search services, each search website may provide users with additional information such as advertisements in a way that may be specific to each search website. For example, each website may present the additional information by inserting the additional information that correspond to the search word for which the search result is presented on the search website as a side banner, etc.

SUMMARY

Example embodiments are directed to provide a service model providing an interactive function between a user and a business operator for efficient marketing.

Another aspect of example embodiments of inventive concepts is directed to provide technology allowing a mobile web to interact with a messenger for communication between a user and a business operator.

In one example embodiment, a communication method performed by a computer, includes identifying, by a processor, a selection instruction for content provided by a content provider, and establishing, by the processor, a communication link between a first account of a user and a second account of a business operator relevant to the content based on the identification of selection instruction.

In yet another example embodiment, the establishing the communication link includes generating a talk window to permit message transmission and reception between the first account and the second account based on the identification of the selection instruction, without a relationship being established between the first and second accounts.

In yet another example embodiment, the establishing the communication link includes providing a selection menu for selecting one of a plurality of communication functions, the plurality of communication functions including a call function enabling a wireless Internet-based voice communication between the first account and the second account and a messaging function enabling an exchange of messages between the first account and the second account.

In yet another example embodiment, the establishing the communication link includes providing the communication link using a function of calling a messenger and a function of transmitting the second account to the messenger are provided by the selection instruction via the user interface displayed along with the content on a service screen provided by the content provider.

In yet another example embodiment, the establishing the communication link includes receiving information associated with the content from the content provider, and automatically linking the information with the talk window at the same time of generating the talk window.

In yet another example embodiment, the establishing the communication link includes providing one of a function that uses a software bot for the business operator in the talk window, and a function that uses a message template to reply automatically or selectively to a message sent via the first account.

In yet another example embodiment, the establishing the communication link includes determining to activate the talk window set by the business operator based on at least one of a use of the talk window and a use time zone associated with the talk window.

In yet another example embodiment, the establishing the communication link includes providing promotional information regarding the content, to the first account through the talk window if a relationship is established between the first account and the second account.

In yet another example embodiment, the establishing the communication link includes anonymously processing personal information of a user associated with the first account or replacing the personal information of the user with arbitrary information to be displayed at a device associated with the second account when no relationship has been established between the first and second accounts.

In yet another example embodiment, the method further includes managing the talk window.

In yet another example embodiment, the managing the talk window includes terminating the communication link between the first account and the second account when at least one of, a time lapses after generating the talk window, a message in not exchanged between the first account and the second account after an exchange of a currently existing final message in the talk window, and the talk window is terminated via at least one of the first account and the second account.

In yet another example embodiment, the managing the talk window includes maintaining a communication record through the talk window without terminating the communication link between the first account and the second account if a relationship is set between the first account and the second account.

In yet another example embodiment, the method further includes monitoring a reply rate of the business operator to a message sent via the first account in the talk window.

In yet another example embodiment, the monitoring the reply rate of the business operator includes determining as the reply rate, a rate with which the business operator, via the second account, replies over a time period to messages sent by all users.

In yet another example embodiment, the monitoring the reply rate of the business operator includes determining the replay rate based on an average reply time taken by the business operator to reply to messages sent via the first account and a total reply rate of the business operator for replying to messages sent by all users.

In yet another example embodiment, the reply rate is used as a reference to provide at least one of compensation or a penalty to the business operator.

In yet another example embodiment, the method further includes displaying a user interface along with the content on a service screen provided by the content provider to enable a messenger call, and the reply rate is used as a reference for determining whether to display the user interface or not.

In one example embodiment, a content display method performed by a computer, includes displaying, by the processor, at least one content on a service screen provided by a content provider, and displaying, by the processor, along with the at least one content, a user interface associated with the at least one content for enabling a messenger call. A communication function is instantly turned on to link a user messenger account with a business messenger account in relation to the at least one content if the user interface is selected.

In yet another example embodiment, the communication function includes at least one of a messaging function capable of performing message transmission and reception between the user messenger account and the business messenger account, and a call function capable of performing a wireless Internet-based voice communication between the user messenger account and the business messenger account.

In yet another example embodiment, the method further includes providing a function of calling a messenger and a function of transmitting the business messenger account to the messenger in response to the selection of the user interface.

In yet another example embodiment, the method further includes transmitting information regarding to the content, to the messenger in response to the selection of the user interface.

In yet another example embodiment, the method further includes managing a list of business categories in which business operators capable of communicating content with the user messenger account are listed, and the displaying of the user interface includes excluding content, which is relevant to a business operator of a specific one of the business categories, from being displayed as the user interface.

In yet another example embodiment, the communication function is configured to allow message transmission and reception between the user messenger account and the business messenger account and manage a reply rate of a business operator associated with the business messenger account, and the displaying of the user interface includes excluding content, which is relevant to a specific business operator selected with reference to the reply rate, from being displayed as the user interface.

In one example embodiment, a non-transitory computer-readable medium stores instructions, which when executed by a processor cause the processor to identify a selection instruction for content provided by a content provider, and establish a communication link between a first account of a user and a second account of the business operator relevant to the content based on the identification of the selection instruction.

In one example embodiment, a communication system includes a memory having computer-readable instructions stored therein and a processor. The processor is configured to execute the computer-readable instructions to, identify a selection instruction for content provided by a content provider, and establish a communication link between a first account of the user and a second account of a business operator relevant to the content based on the selection instruction.

In yet another example embodiment, the processor is configured to generate and activate a talk window to permit message transmission and reception between the first account and the second account at the same time of identifying the selection instruction, without a relationship being established between the first and second accounts.

In yet another example embodiment, the processor is configured to provide a selection menu for selecting one of a plurality of communication functions, the plurality of communication functions including a call function enabling a wireless Internet-based voice communication and a messaging function capable enabling an exchange of messages between the first account and the second account.

In yet another example embodiment, the processor is further configured to manage the talk window, and terminate the communication link between the first account with the second account when at least one of, a time lapses after generating the talk window, a message is not exchanged between the first account and the second account after an exchange of a currently existing final message in the talk window, and the talk window is terminated or deleted via at least one of the first account and the second account.

In one example embodiment, a content display system includes a memory having computer-readable instructions stored therein, and a processor. The processor is configured to execute the computer-readable instructions to, display at least one content, and display a user interface associated with the at least one content for enabling a messenger call. The process is configured to instantly turn on a communication function to link a user messenger account with a business messenger account in relation to the at least one content if the user interface is selected.

In yet another example embodiment, the communication function includes at least one of a messaging function capable of performing message transmission and reception between the user messenger account and the business messenger account and a call function capable of performing a wireless Internet-based voice communication between the user messenger account and the business messenger account.

In yet another example embodiment, the user interface is configured to include a function of calling the business messenger account and a function of transmitting the business messenger account to the messenger.

In yet another example embodiment, the processor is configured to, manage a list of business categories in which business operators capable of communication content with the user messenger account are listed, and exclude from being displayed as the user interface, content relevant to a business operator associated with a specific one of the business categories.

In yet another example embodiment, the processor is configured to, enable message transmission and reception between the user messenger account and the business messenger account and manage a reply rate of a business operator associated with the business messenger account, and exclude content, which is relevant to a specific business operator selected with reference to the reply rate, from being displayed as the user interface.

In the example embodiments described above, since establishing the communication between the user and the business operator for a transaction, such as e-commerce, is simplified and thereby the efficient communication can be implemented, the amounts of data processing (i.e., data usage and/or resource usage) and computation required to the transaction can be reduced in the user's client and the business operator's resources (e.g., servers). Also, the data related to the communication, such as talk records and environmental settings for accounts, account connection states of talk windows, and reply rates of business operators, can be efficiently managed.

BRIEF DESCRIPTION OF THE FIGURES

FIG. 12 shows a table classifying categories of businesses requiring the store talk in accordance with an example embodiment.

DETAILED DESCRIPTION OF EXAMPLE EMBODIMENTS

Figure 1:
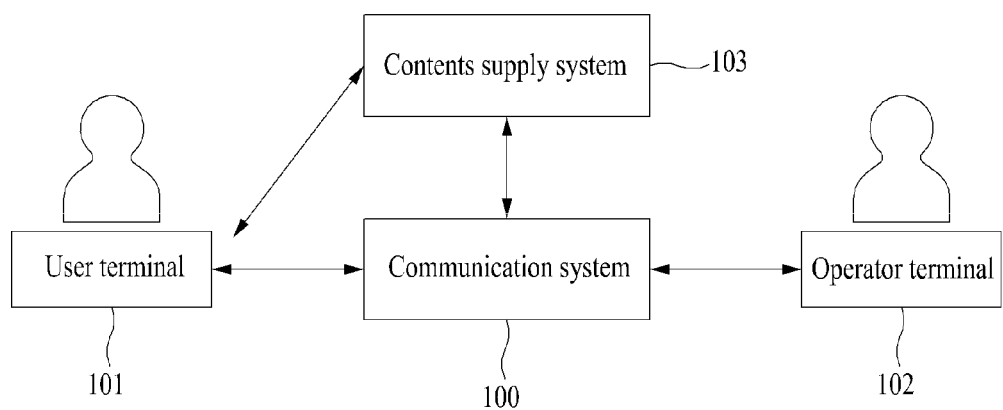
FIGS. 1 and 2 are block diagrams illustrating communication environments through service interaction in accordance with example embodiments.

Now hereinafter will be described EXAMPLE embodiments of inventive concepts in conjunction with accompanying drawings.

Example embodiments may be embodied in various different forms, and should not be construed as being limited only to the illustrated embodiments. Rather, these example embodiments are provided as examples so that this disclosure will be thorough and complete, and will fully convey the concept of the inventive concept to those skilled in the art. Accordingly, known processes, elements, and techniques are not described with respect to some of the embodiments of the inventive concept. Unless otherwise noted, like reference numerals denote like elements throughout the attached drawings and written description, and thus descriptions will not be repeated.

It will be understood that, although the terms "first", "second", "third", etc., may be used herein to describe various elements, components, regions and/or sections, these elements, components, regions and/or sections should not be limited by these terms. These terms are only used to distinguish one element, component, region or section from another region or section. Thus, a first element, component, region or section discussed below could be termed a second element, component, region or section without departing from the teachings of the present disclosure.

The terminology used herein is for the purpose of describing particular example embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element is referred to as being "on", "connected to", "coupled to", or "adjacent to" another element, it can be directly on, connected, coupled, or adjacent to the other element, or intervening elements may be present. In contrast, when an element is referred to as being "directly on," "directly connected to", "directly coupled to", or "immediately adjacent to" another element, there are no intervening elements present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

It will be apparent to those skilled in the art that various modifications and variations can be made to the example embodiments without departing from the spirit or scope of the inventive concepts described herein. Thus, it is intended that the example embodiments cover the modifications and variations of the example embodiments provided they come within the scope of the appended claims and their equivalents.

Example embodiments relate to a method and system providing a communication function between a user and a business operator through interaction with a mobile web. Methods and systems disclosed herein may be applicable to marketing models which, for a more-one-man company (or store), induce clients toward an on-line/off-line store visit from message transmission to the clients.

Example embodiments may be regarded as service models to provide marketing solutions for on-line/off-line stores. A business operator mentioned herein may include storekeepers or managers of off-line stores as well as storekeepers and managers of on-line stores.

FIG. 1 illustrates a communication environment through service interaction in accordance with an example embodiment. FIG. 1 shows a user terminal 101, an operator terminal 102, a contents supply system 103 and a communication system 100. In FIG. 1, the arrows indicate that data may be transmitted and/or received through a wired and/or wireless communication between the elements.

The user terminal 101 and the operator terminal 102 may be one of all known or to be developed terminals, which may have stored thereon an executable service-exclusive application (hereinafter, referred to as a "messenger app"). For example, the user terminal 101 and the operator terminal 102 may be any one of a Personal Computer (PC), laptop computer, a smart phone, and/or a tablet computer. The user terminal 101 and the operator terminal 102 may perform service operations such as service screen formation, data input, data exchange (transmission and reception), data storage, and so on.

The communication system 100 may act as a messenger platform to provide messenger services for clients such as the user terminal 101. The communication system 100 may be, namely, a system to provide messenger services capable of transmitting and receiving data in real time between the operator terminal 102 and the user terminal 101 in which a messenger app is installed. In this regard, the communication system 100 may be implemented in a form of application on the user terminal 101 and the operator terminal 102, but example embodiments are not limited thereto. The communication system 100 may be also implemented in a configuration that is included in a service platform to provide messenger services under a client-server environment.

More specifically, in one or more example embodiment, the communication system 100 may interact with the content supply system 103 to provide a communication function (hereinafter, referred to as "store talk") between a messenger account of a business operator corresponding to pieces of contents and a messenger account of a user when the user accesses the pieces of contents which is supplied through the content supply system 103. The content supply system 103 may be regarded as one of all kinds of content providers which provide pieces of contents related to a business operator for a user. For example, the content supply system 103 may provide pieces of contents to users through a specific portal site or provide pieces of contents directly to users without any portal site.

Figure 2:
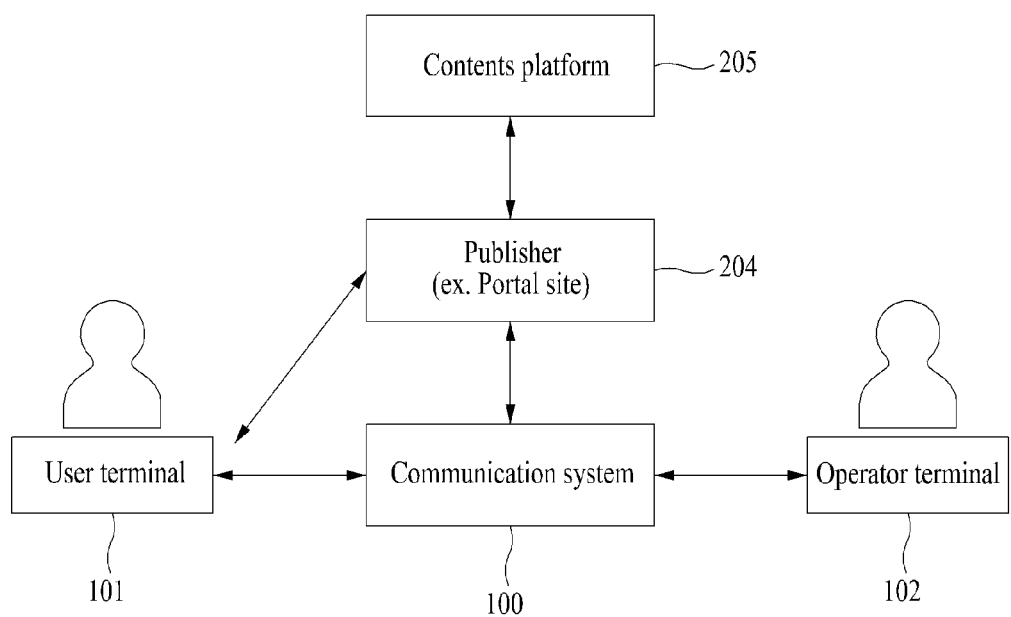

FIG. 2 illustrates a system structure to provide pieces of contents to users in accordance with an example embodiment.

Referring to FIG. 2, a publisher 204 may display pieces of contents of a business operator and thereby the communication system 100 may interact with the publisher 204 to provide a store talk between the user terminal 101 and the operator terminal 102 corresponding to the pieces of contents when a user accesses the pieces of contents displayed through the publisher 204.

In the specification, the term "publisher" may be used interchangeably with the term "site". But, descriptions adopting the term "site" may not be construed as excluding example embodiments according to which environments without general website connections of PCs such as application screens are used. To the contrary, the term "site" may be reciprocally and/or interchangeably used with "publishing site" or the "publisher". Each site may correspond to individual publishers (e.g., a first publisher, a second publisher, and the like) which are included in the publisher 204. Such a term "site" may mean as including all kinds of websites capable of displaying pieces of contents and providing the pieces of contents to the user terminal 101 through a wired and/or wireless network, and may indicate one webpage which forms a website.

Pieces of contents may indicate all kinds of documents which can be displayed through the publisher 204. For example, pieces of contents may include a variety of information about advertisements, locations, products, and photographs or motion pictures, those of which are provided from on-line/off-line middle and small scale stores, companies, shopping malls, and others (personal blogs, etc.) by business operators. This content display may be regarded as displaying pieces of contents such as texts, images, sound, motion pictures, and hyperlinks, which are involved in business operators, to visitors (i.e., users) of corresponding sites through sites (publishers).

The publisher 204 may provide its own site (website) to the user terminal 101, and provide pages, which are included in a site, to the user terminal 101 through the site or provide a search result of a keyword to the user terminal 101 through the keyword input thereto. During this, the publisher 204 may receive pieces of contents, which are to be displayed, through pages and then provide the content to the user terminal 101. For example, the publisher 204 may receive pieces of contents, which are suitable for a keyword input by a user, from a content platform 205 and then provide the pieces of contents as a search result to the user terminal 101. In this regard, the content platform 205 may indicate a system which registers and arranges pieces of contents, and provides the pieces of contents to the publisher 204. In one example embodiment and when pieces of contents are advertisements, the content platform 205 may act as an advertisement platform to perform a bid for an advertisement of a sponsor, a matching between an advertisement and a keyword, an arrangement of advertisements or sponsors, a supply of advertisement to the publisher, and a charge for advertisement display.

The publisher 204 may provide a path (screen) through which pieces of contents are provided directly to a user, and the pieces of contents may be provided through a website under a general on-line environment. In this configuration, each of a plurality of individual platforms (e.g., a first platform, a second platform, and the like) may display pieces of contents through at least one of a plurality of individual publishers (e.g., a first publisher, a second publisher, and the like) which are included in the publisher 204. Additionally, each of the plurality of individual publishers may display the pieces of contents to a user through at least one site, and relative to such display of the pieces of contents, provide at least one of various services such as a consolidated search, shopping, map, estate, cafe/blog, social network, and so on through a wired and/or wireless network.

In one example embodiment, a messenger app may include communication functions such as messaging to exchange messages, and free call to provide a wireless internet call service.

Figure 3:
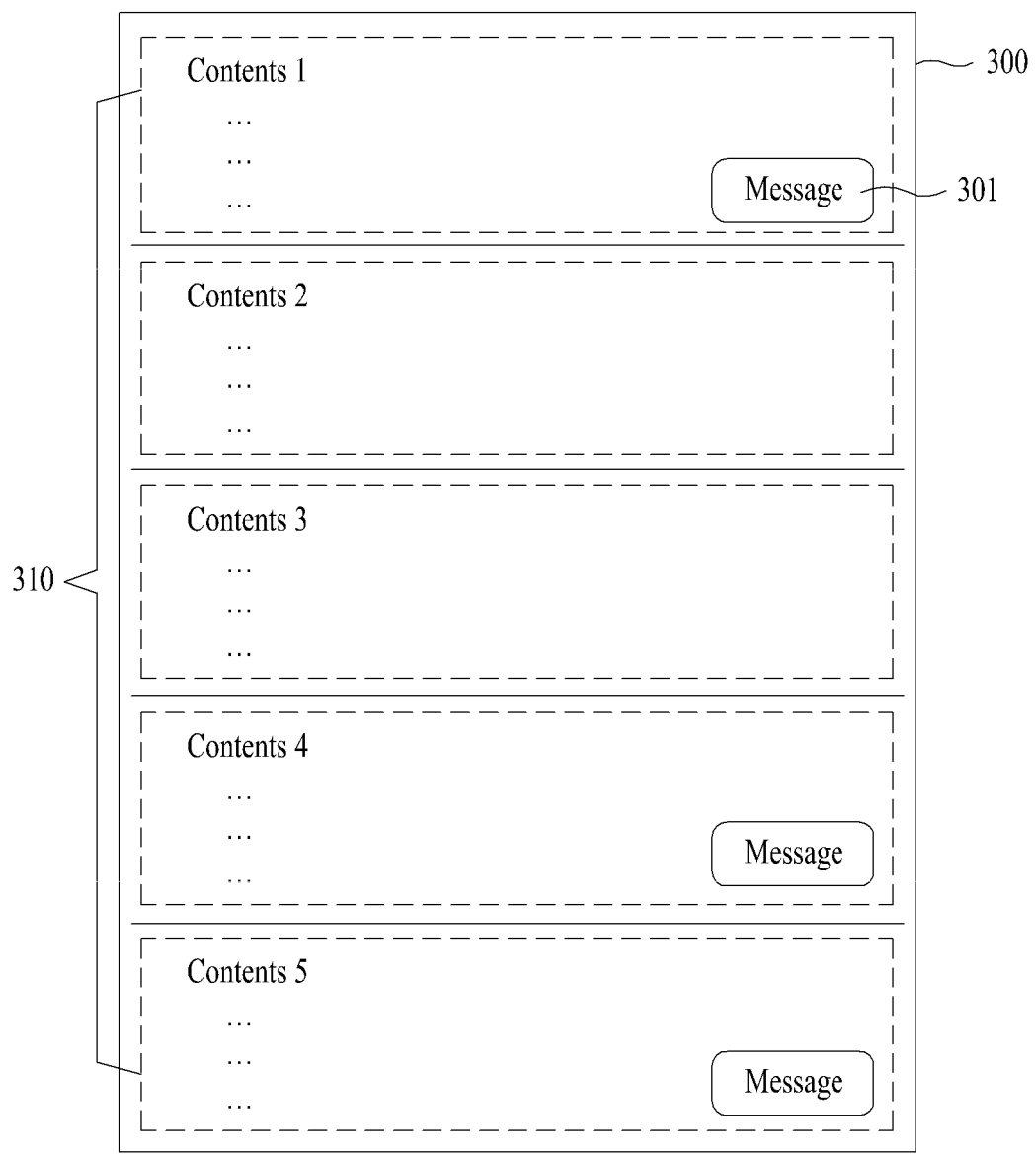
FIGS. 3 to 5 illustrate processes of displaying pieces of contents by a publisher in accordance with example embodiments.
Figure 4:
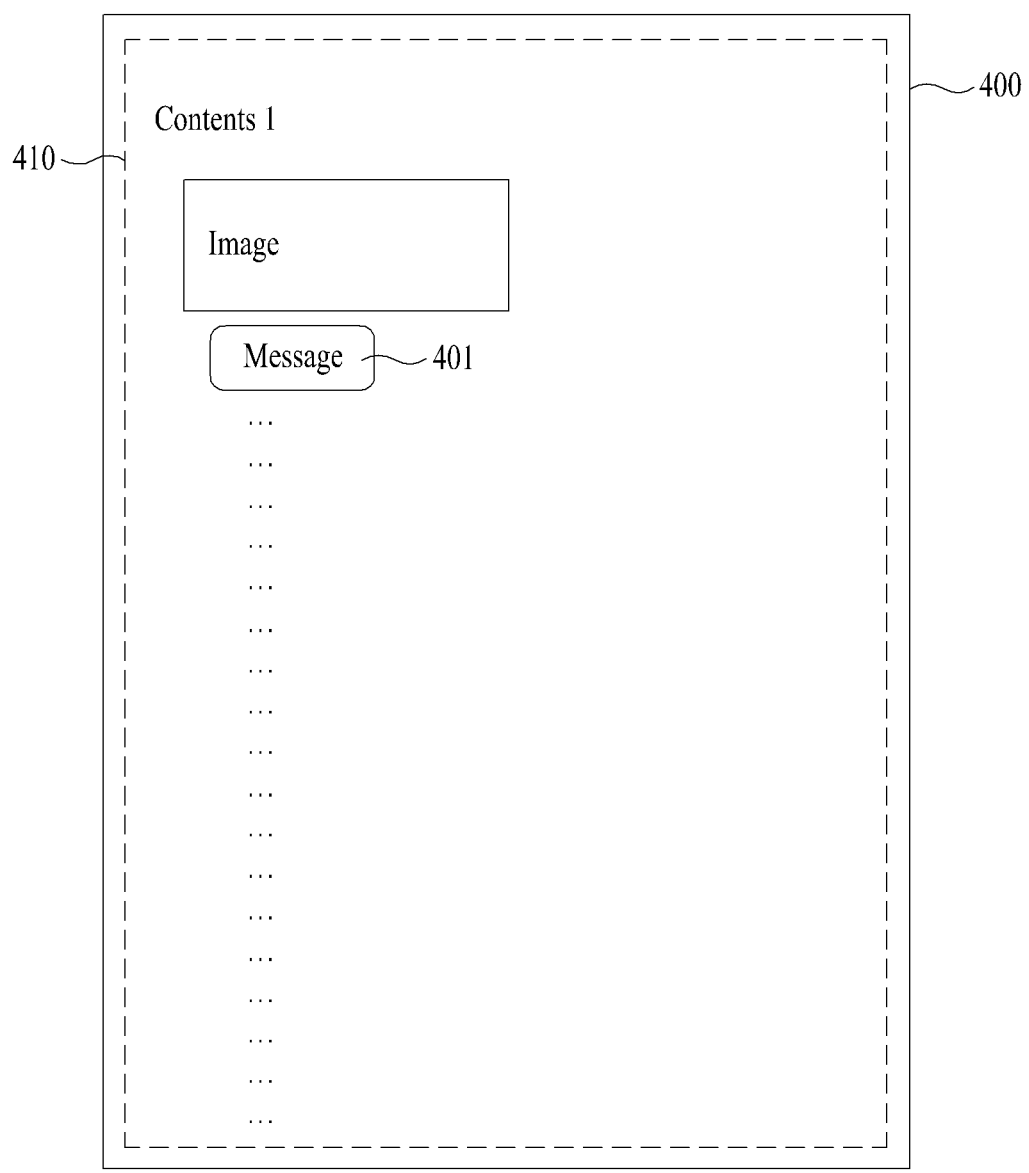
Figure 5:
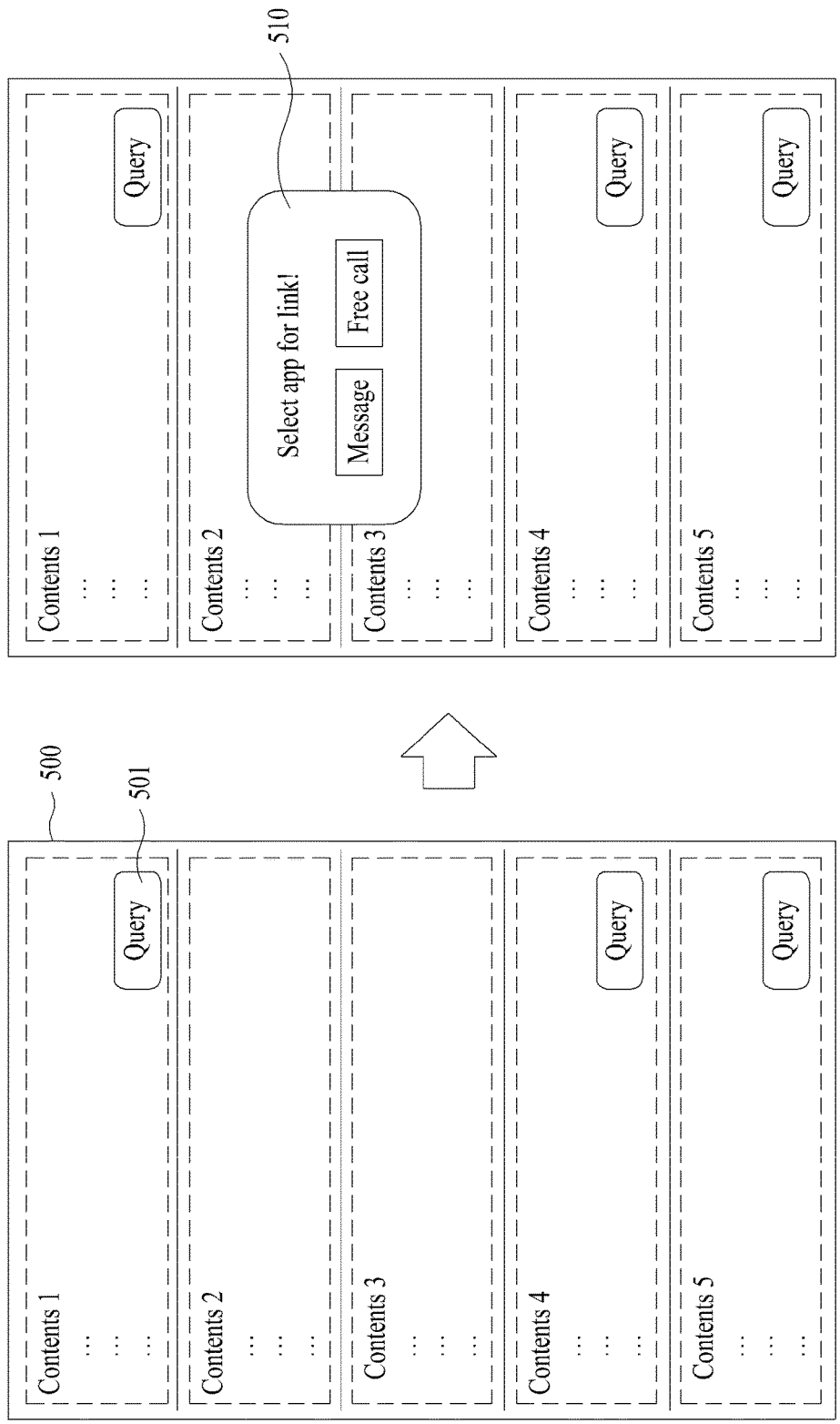

FIGS. 3 to 5 illustrate a process of displaying pieces of contents by a content provider in accordance with an example embodiment.

FIGS. 3 and 4 show service screens 300 and 400 to display pieces of contents of a business operator. The service screens 300 and 400 may indicate a variety of screens through which a content provider offers business services such as consolidated search, shopping, map, estate, café/blog, social network, and so on. FIG. 3 illustrates the service screen 300 to display a content list (e.g., a search list) which is registered by one or more business operators, while FIG. 4 illustrates the service screen 400 to display detailed information of a piece of specific content.

At least one of pieces of contents 310 and 410 may be displayed in the service screens 300 and 400, and user interfaces 301 and 401 may be displayed for interaction with a messenger in correspondence respectively with pieces of contents 310 and 410. If there are needs for query, reservation, order, and counsel about pieces of specific contents, a user may be able to make a one-to-one talk with a business operator through a messenger which interacts with the user interfaces 301 and 401.

The pieces of contents 310 and 410 may include information about a messenger account of a business operator. For example, a content provider may display the user interfaces 301 and 401 for all pieces of contents 310 and 410 about which a messenger account of a business operator is present and a pre-agreement is established for messenger interaction. As another example, business operators may be managed according to the categories of businesses and a content provider may exclude pieces of contents, which belong to a specific business, from the display of the user interfaces 301 and 401. As still another example, the communication system may monitor and report reply rates by communication with a user to each business operator. During this, a content provider may exclude pieces of contents of a specific business operator from the display of the user interfaces 301 and 401.

In displaying various kinds of the pieces of contents 310 and 410 which are provided on a mobile web for the user terminal through the service screens 300 and 400, the content provider may display the user interfaces 301 and 401, which can interact with a mobile messenger, along with the pieces of contents 301 and 401. During this, the user interfaces 301 and 401 may include functions of calling a messenger for automatic switchover to the messenger, and transferring information about a messenger account of a business operator, which correspond to pieces of contents, to the messenger. Additionally, the user interfaces 301 and 401 may further include a function of transferring information of a content database, which is received from a content platform for a corresponding piece of content for cooperation between the content database and a messenger, to the messenger.

Additionally, the user interfaces 301 and 401 may be formed with a communication function which may be provided in a mobile messenger. As shown in FIGS. 3 and 4, the user interfaces 301 and 401 may be formed to directly call a messaging function from communication functions on a mobile messenger.

As another example, a content provider may form a user interface to allow a selective access to all communication functions which may be provided in a mobile messenger. For example, referring to FIG. 5, if a user inputs the displayed user interface 501 along with pieces of contents into the service screen 500, a popup window 510 may be provided to select one of a messaging function and a free call function. Accordingly, the user may select his desired mode from the messaging function and the free call function to proceed with a one-to-one talk with a business operator.

A content provider may configure the user interface with communication functions automatically classified by business categories, or with communication functions desired by business operators according to needs of the business operators. In this configuration, it may be permissible, according to a category of business when pieces of contents are displayed, to open a user interface providing only a messaging function, a user interface providing only a free call function, or a user interface providing both functions. For example, in regard to the free call function, it may be permissible to support business operators, which are in higher demand, such as foods delivery service.

Figure 6:
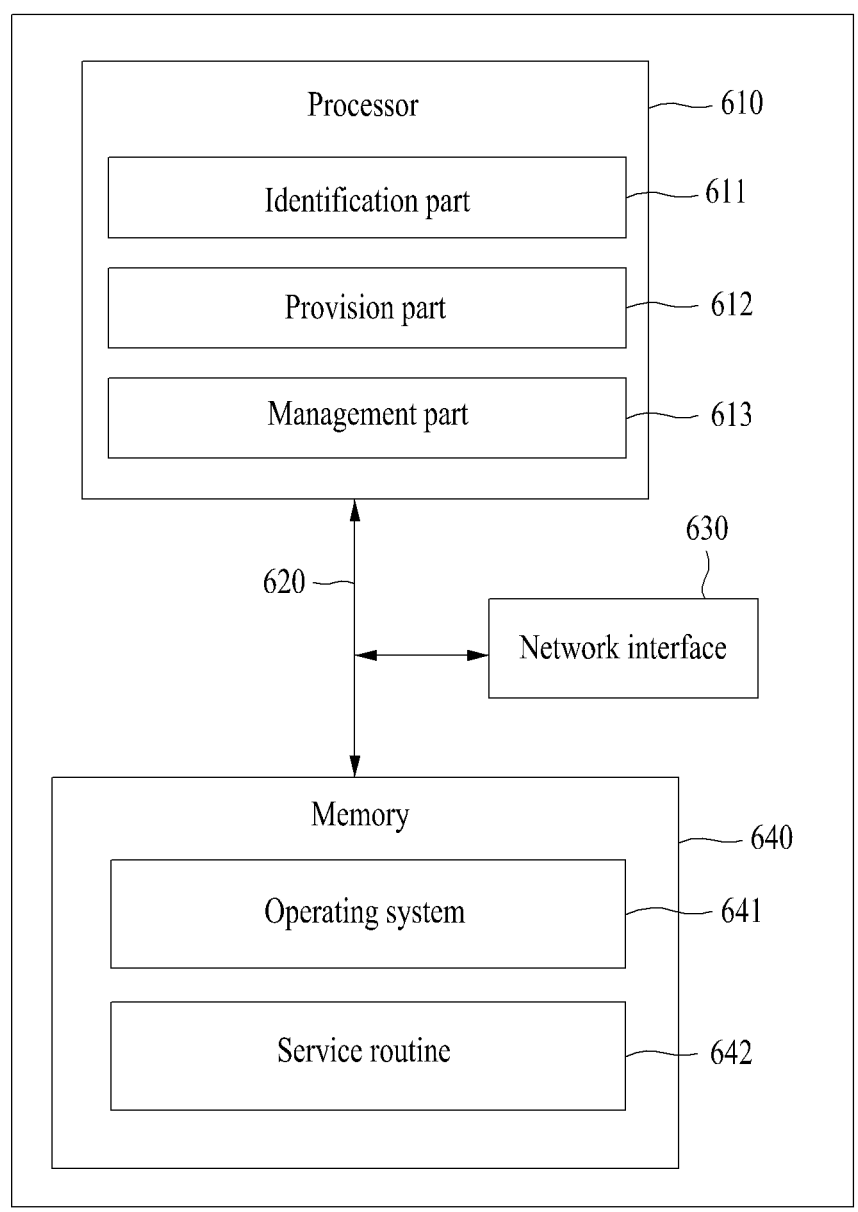
FIG. 6 is a block diagram illustrating an internal configuration of a communication system in accordance with an example embodiment.

FIG. 6 is a block diagram illustrating an internal configuration of a communication system in accordance with an example embodiment.

As shown in FIG. 6, a communication system 600 according to an example embodiment may include a processor 610, a bus 620, a network interface 630, and a memory 640. The memory 640 may include an operating system 641 and a service routine 640. The processor 640 may include an identification part 611, a provision part 612, and a management part 613. In one or more example embodiments, the communication system 600 may even include additional units/components other than or in addition to those of FIG. 6.

The memory 640 may include the operating system 641 and the service routine 642. The processor 640 may include the identification part 611, the provision part 612, and the management part 613. In one or more example embodiments, the communication system 600 may even additional elements other than or in addition to those of FIG. 6.

The memory 640 may be a computer readable recording medium including a permanent mass storage device such as Random Access Memory (RAM), Read Only Memory (ROM), or disk drive. Additionally, the memory 640 may store program codes for the operating system 641 and the service routine 642. These software elements may be loaded from an additional computer-readable recording medium which is independent from the memory 640. Such an additional computer-readable recording medium (not shown) may include a floppy disk, a disk, a tape, a DVD/CD-ROM drive, a memory card, and so on. In another example embodiment, software elements may be even loaded into the memory 640 through the network interface 630 which is not a computer-readable recording medium.

The bus 620 may allow communication and data transmission between elements of the communication system 600. The bus 620 may be formed using a high-speed serial bus, a parallel bus, a Storage Area Network (SAN) and/or another suitable communication technology.

The network interface 630 may be a computer hardware element for connecting the communication system 600 with a computer network. The network interface 630 may connect the communication system 600 with a computer network through a wireless and/or wired connections.

The processor 610 may be configured to perform basic arithmetic operations, input/output operations of a logic unit and the communication system 600 to process instructions of computer programs. Instructions may be provided to the processor 610 through the bus 620 by the memory 640 or the network interface 610. The processor 610 may execute one or more computer-readable programs for the identification part 611, the provision part 612, and the management part 613. The computer-readable program may be stored in a recording unit such as the memory 640.

The identification part 611, the provision part 612, and the management part 613 may be formed to perform a communication method described below.

Figure 7A:
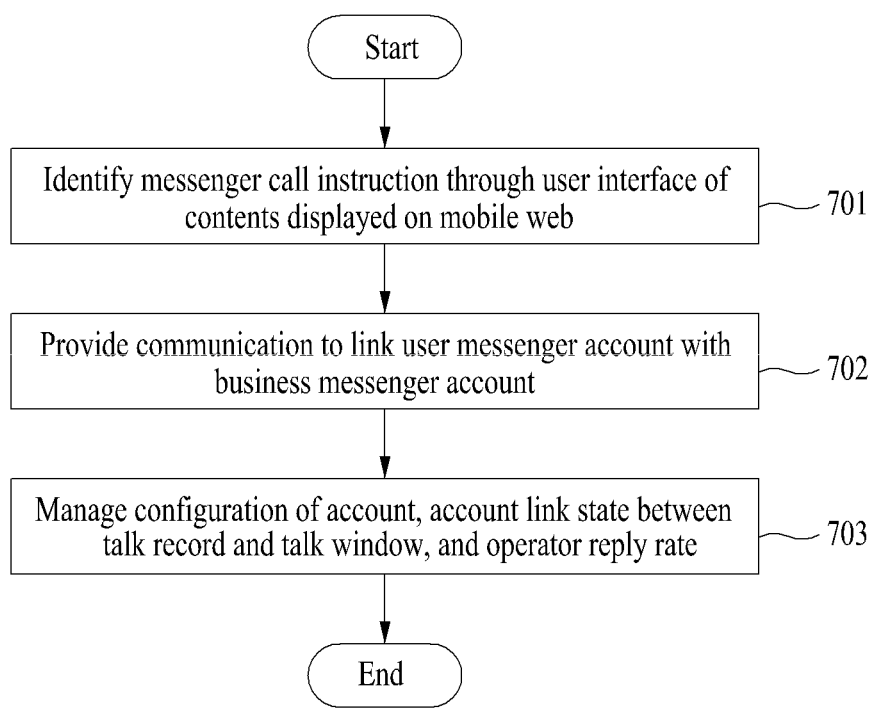
FIG. 7A is a flow chart showing a communication method in accordance with an example embodiment.

FIG. 7A is a flow chart showing a communication method in accordance with an example embodiment. This communication method according to an example embodiment may be performed with steps respective to the identification part 611, the provision part 612, and the management part 613 which are elements of the communication system aforementioned through FIG. 6. While steps below are described from the perspective of various parts such as the identification part 611, the provision part 612, and/or the management part 613, example embodiments are understood to be carried out by the processor 610, which includes the various parts.

At step 701, the identification part 611 may identify a messenger call instruction through a user interface of pieces of contents displayed on a mobile web. The identification part 611, namely, may interact with a content provider, which displays pieces of contents, to identify a messenger call instruction upon which a user interface displayed along with the pieces of contents is selected by a user. While identifying the messenger call instruction, the identification part 611 may receive information about a business messenger account relevant to the pieces of contents, which correspond thereto, from the content provider. Additionally, while identifying the messenger call instruction, the identification part 611 may also receive information about the pieces of contents corresponding thereto. During this, the information about the pieces of contents may include at least one of information relevant to the display on the mobile web, and information of a link which can access the mobile web displaying the pieces of contents.

At step 702, according to the identification of a messenger call instruction, the provision part 612 may connect a user messenger account with a business messenger account of the user interface selected by the user to provide a store talk between the user and the business operator. During this, the store talk may be provided under a communication environment by one of a messaging function and a free call function which can be allowed in the messenger. A communication form of the store talk may be selectively set by a user or based on a pre-agreement with a business operator.

For example, responding to a messenger call instruction, the provision part 612 may directly connect a user messenger account with a business messenger account to provide a wireless Internet telephone service between users. Accordingly, a user may be able to instantly use a call function, which is provided from a mobile messenger, for query, order, reserve, or obtain information about a piece of specific content, which is searched out from a mobile web, to directly communicate with a business operator.

As another example, responding to a messenger call instruction, the provision part 612 may instantly generate and activate a talk window which includes a user messenger account and a business messenger account. During this, the provision part 612 may provide a communication function to allow a communication session between the user messenger account and the business messenger account under a state without any friendship between the user and the business operator. If a user selects a user interface which is displayed along with pieces of contents in a mobile web, a talk window, through which a user account is connected with a business account interacting with the pieces of contents corresponding thereto, is instantly open to allow the user to talk/exchange instant message with a business operator without an additional setting process such as establishing a friendship between the user and the business operator within the messenger app. As another example, the provision part 612 may optionally provide a function to set the friendship between the user and the business operator within the messenger app before providing the talk window. When a talk window connected with an operator account and a user account is open to display personal information (e.g., ID, profile image, etc.) between the business operator and the user therein, the user's personal information may be anonymously displayed or replaced with some information under a state without friendship between the user and the business operator. At the same time when a talk window is prepared between a user and a business operator, the provision part 612 may display information about pieces of contents selected by the user through a user interface to automatically connect the user with the information to be asked of the business operator. Additionally, the provision part 612 may provide the business operator with a function of automatically replying to a message sent by a user through a software bot in a talk/instant messaging window between the user and the business operator, and a function of replying selectively or automatically to a message, which is sent from a user, by using a message template preliminarily composed. If a user adds a business operator to the friendship, the business operator may provide a variety of benefits (e.g., discount, coupon, free delivery, etc.) to the user. For example, the provision part 612 may provide a function of preliminarily registering information of benefits (e.g., coupon, etc.) for a business operator, and a function of automatically transmitting the registered benefit information for a user which is has established a friendship with the business operator within the messenger app (This may hereinafter be also referred to as establishing a friendship, friendship addition and/or forming a friendship). Accordingly, a user may be allowed to instantly connect a mobile messenger to a piece of specific content which is searched out in a mobile web and conduct one-to-one communication, such as query, order, reservation, counsel, and so on, with a business operator, and a business operator may provide the user, who is connected through the mobile messenger, with a variety of offers and benefits such as coupons and messages relevant to pieces of contents of the mobile web.

At step 703, the management part 613 may manage general environments involved in a store talk, for example, talk records and environmental settings for accounts, account connection states of talk windows, and reply rates of business operators.

The management part 613 may provide a Contents Management System (CMS) environment for a messenger account of a business operator, as well as a messenger account of a user, and support various types of environmental settings for a store talk which interact with a mobile web for the user. For example, a user may be able to register introduction information (e.g., formal site URL, telephone number, store presentation, profile image, map, etc.) to be displayed on a messenger service, various pieces of contents (product item, coupon, etc.), and notifications. Additionally, a business operator may set whether to turn a store talk on or off, an available time of the store talk, and a reply engagement time for a message sent from a user. The reply engagement time, as a time in which a business operator engages to replay to a message of a user (e.g., engages to reply in 30 minutes to a user's query), may be set on the initiative of a business operator through a pre-agreement with the business operator or CMS. The reply engagement time may have a limit defined in the system. The limits of the reply engagement time may be managed differently in accordance with business categories. For example, the reply engagement time limits may be provided with 30 minutes at maximum for shopping malls or clinics, while 24 hours at maximum for lodging or a move. Additionally, a business operator may use a software bot to set an automatic reply function to a message of a user, and prepare a message template or set a reply by using the prepared message template. Accordingly, the provision part 612 may reflect environments and conditions, which are set by a business operator, in a talk window between a user and the business operator. For example, after checking an on/off-state and an available time zone which are set in a business messenger account, it may be allowable to generate a talk window only during the on-state or the available time zone, or preliminarily generate a talk window during the off-state or out of the available time zone to inform a user of a store talk state of a business operator.

Additionally, the management part 613 may manage a talk window linking to a user messenger account and a business messenger account. It may be allowable to prevent user information from being displayed from talk records before friend addition under the state that there is no friendship between a business operator and a user within the messenger app, and prevent a business operator from pushing a message to a user because a push-type talk is unavailable after a business messenger account is disconnected with a user messenger account. Therefore, if a messenger call instruction is input through a mobile web, accounts may link up with each other, regardless of friendship setting, to allow an instant talk between a user and a business operator but a talk window between the user and the business operator may be once provided before forming friendship between them. For example, the management part 613 may use a timer chat, after generating a talk window, to maintain a link between two accounts for a predetermined (and/or alternatively, desired) time, disconnect the link between the user messenger account and the business messenger account after the predetermined (and/or alternatively, desired) time, and interrupt message transmission and reception in the talk window. As another example, if a non-reply state between a user and a business operator is maintained for a predetermined (and/or alternatively, desired) time after the last message in a talk window, the management part 613 may disconnect a user messenger account and a business messenger account each other and interrupt message transmission and reception in the talk window. Additionally, if a user leaves or remove a talk window, the management part 613 may disconnect a user messenger account and a business messenger account each other and interrupt message transmission and reception in the talk window. It may be allowable to reconnect the talk window between the user and the business operator thereafter, but impossible to permit a message push from the business operator. During this, a talk record when the user and the business operator are disconnected may be maintained as reference for a predetermined (and/or alternatively, desired) period, or also deleted at the time of disconnecting accounts between the user and the business operator in accordance with service management. Since message transmission and reception is permitted whenever a user forms friendship with a business operator, the business operator may operate a message push and maintain a talk/communication record.

Additionally, the management part 613 may monitor a reply rate of a business operator in a store talk. For example, the management part 613 may use a reply rate, which is taken within a predetermined (and/or alternatively, desired) reply engagement time, of the total reply to calculate a reply rate. For example, business operators may utilize a mobile messenger to provide a user with special services such as a product order, reservation, location identification, estimation, counsel/retrieval of information about a particular content, and so on, and reply to a request of a user for the special services. Accordingly, the management part 613 may calculate a reply rate by monitoring a reply time taken until a reply is provided by a business operator to a message of a user, and calculate from the replay of the business operator. As another example, the management part 613 may calculate a reply rate from an average reply time taken until a business operator replies to messages of a user, and the total reply rate of the business operator to messages of all users.

Namely, a reply rate of a business operator (i.e., business replay rate) may be given by [Business reply rate=Average reply time×Total reply rate].

In this regard, a business reply rate may be included in a report relevant to a business operator, and may be applicable as a reference in providing a reward or penalty for the business operator. As another example, a business reply rate may be utilized as one of references to arrange pieces of contents in a mobile web (content provider), and the pieces of contents may be arranged in the order of higher reply rates when the pieces of contents are displayed in the mobile web. As still another example, a business reply rate may be utilized as one of references to determine to display a user interface, which is displayed along with pieces of contents in a mobile web, for a store talk. For example, during content display in a mobile web, pieces of contents of a business operator under a predetermined (and/or alternatively, desired) level of reply rate may be restrictive in display of a user interface.

Figure 7B:
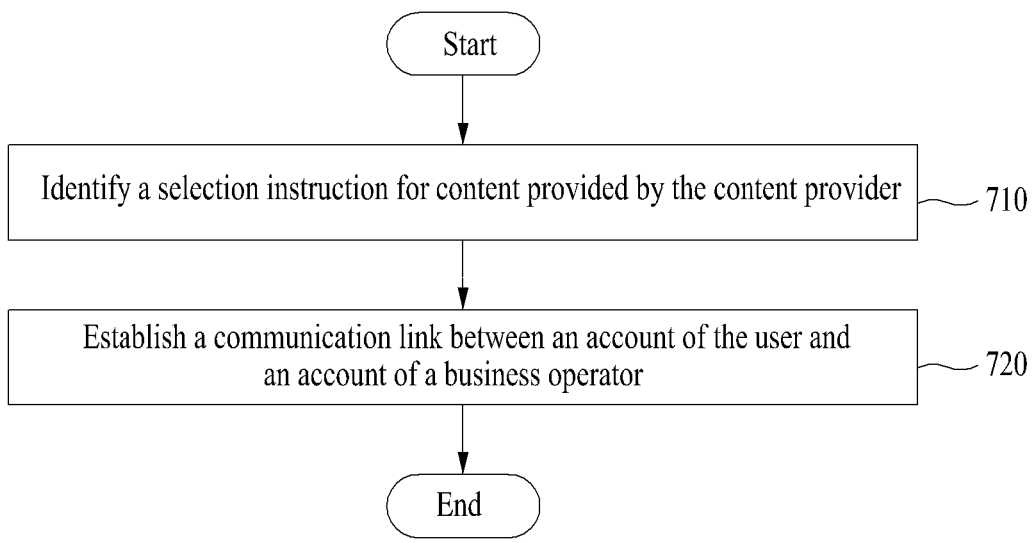
FIG. 7B is a flow chart showing the communication method with reference to FIG. 7A in a different point of view in accordance with an example embodiment.

FIG. 7B is a flow chart showing the communication method with reference to FIG. 7A in a different point of view in accordance with an example embodiment. Technical descriptions provided with reference to FIG. 7A may be applicable hereto and thus, repeated descriptions will be omitted here for brevity.

At step 710, the identification part 611 of the processor 610 may identify a selection instruction for content provided by the content provider. The identification part 611 may receive the selection instruction from the content provider in response to the selection of the user interface by the user, in which the user interface displayed with the content is provided on a service screen (e.g., a portal site) provided by the content provider. For example, the identification part 611 may identify the selection instruction by detecting a signal representing the selection of the user interface by the user.

At step 720, the provision part 612 of the processor 610 may establish a communication link between an account of the user who selects the user interface and an account of a business operator relevant to the content provided by the content provider. The established communication link may correspond to any connection or communication means between the user and the business operator to provide the store talk, the wireless Internet telephone service or the talk window associated with the messenger described with reference to FIG. 7A.

Figure 8:
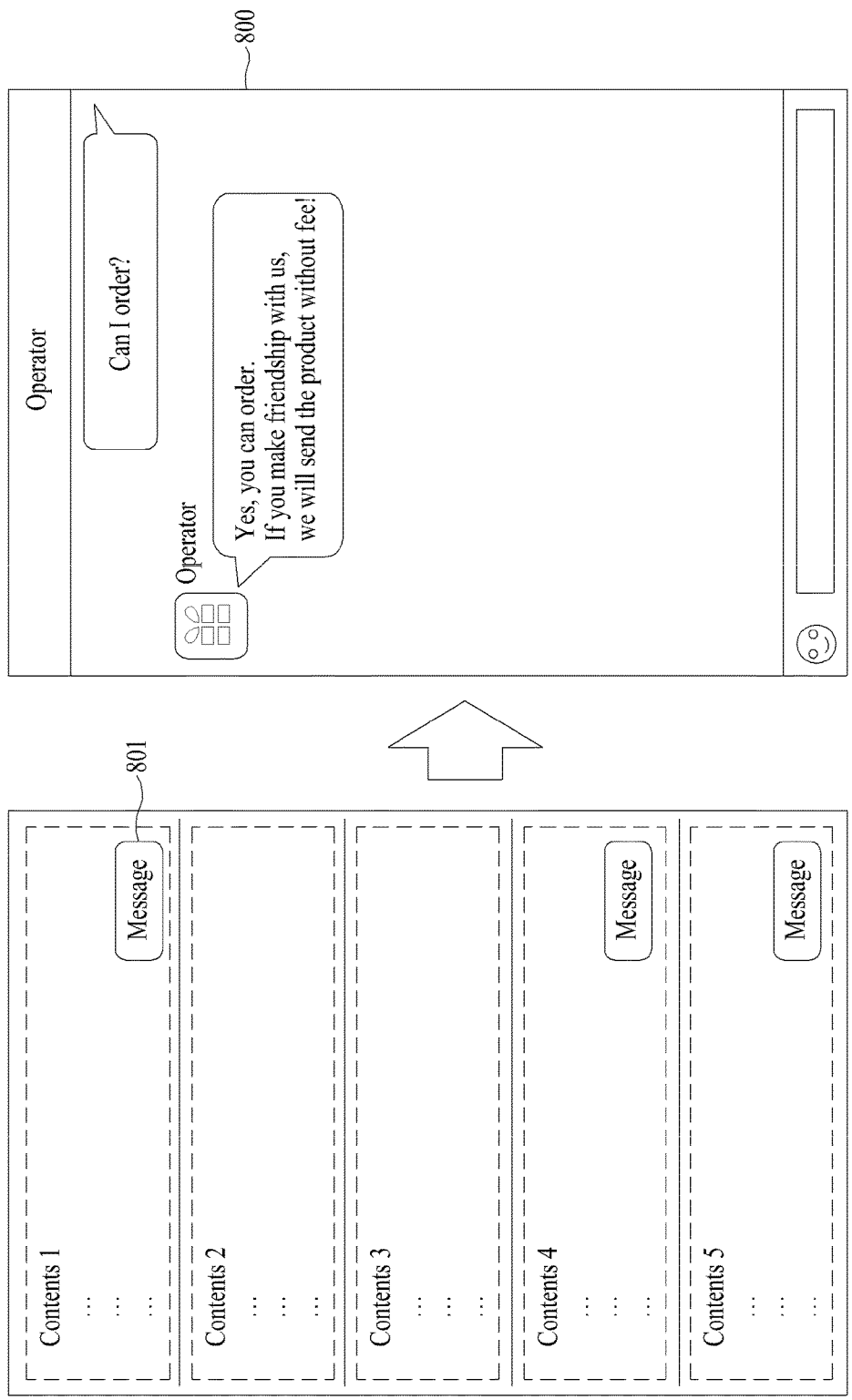
FIGS. 8 to 10 illustrate processes of switchover from a mobile web to a mobile messenger in accordance with example embodiments.
Figure 9:
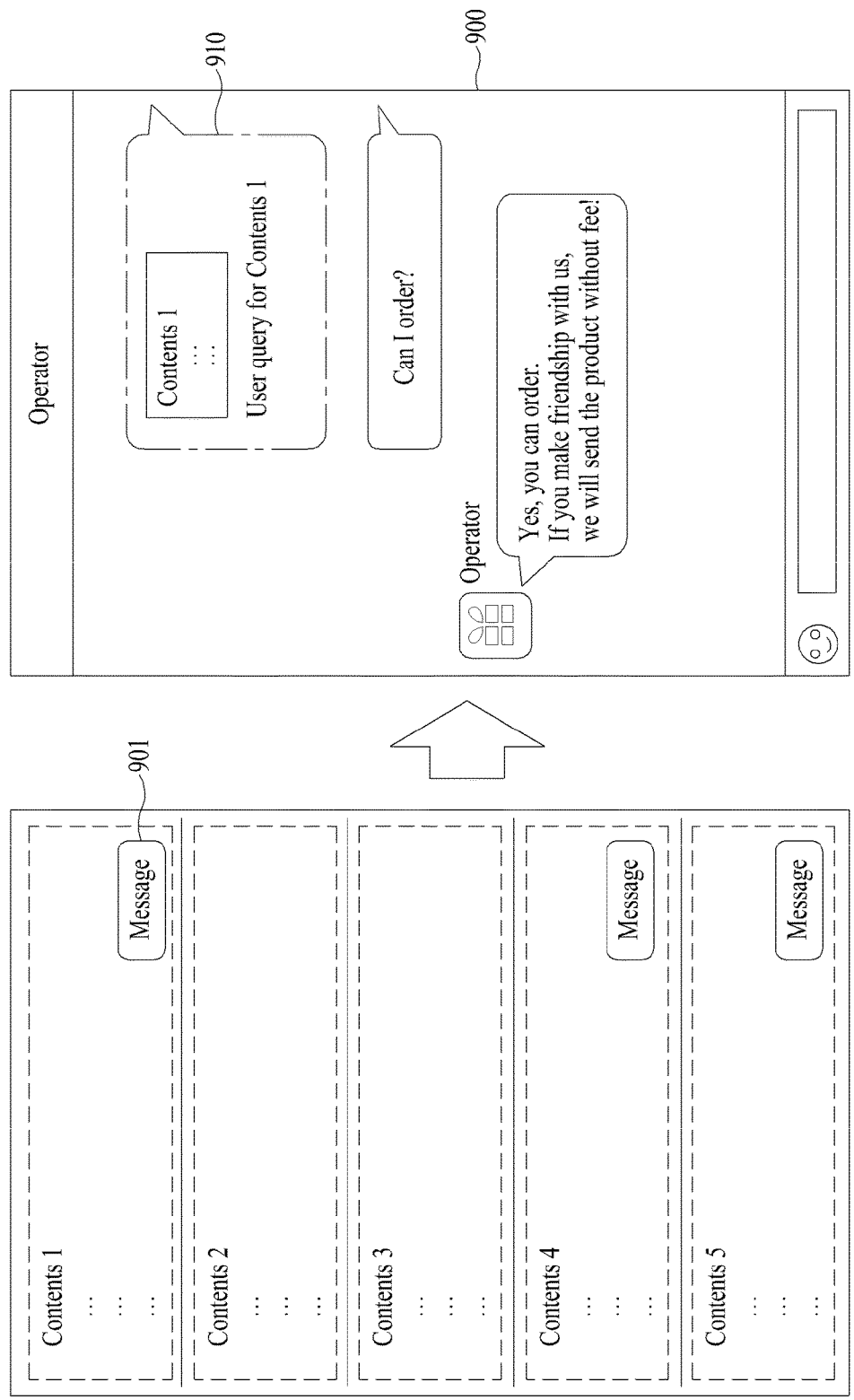
Figure 10:
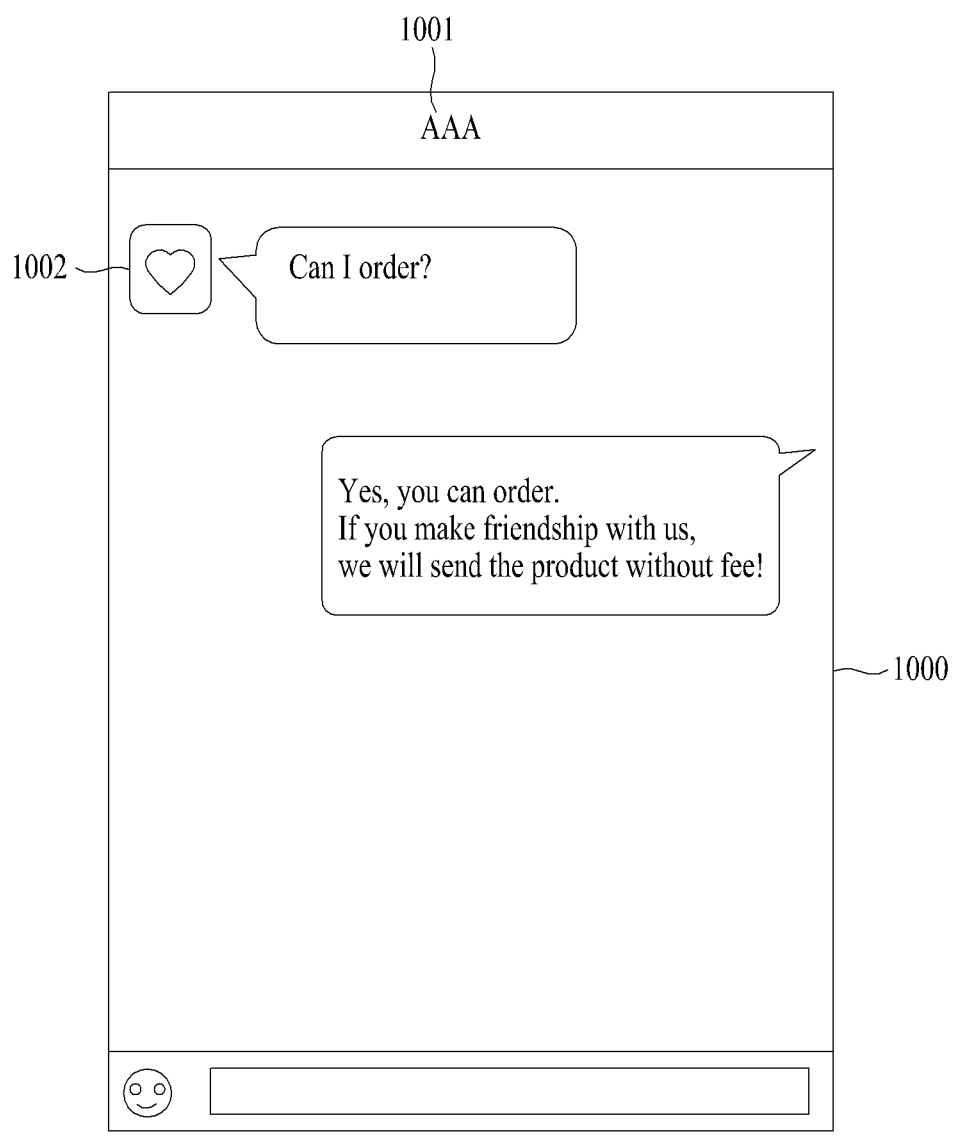

FIGS. 8 to 10 illustrate a process of switchover from a mobile web to a mobile messenger in accordance with an example embodiment.

Referring to FIG. 8, if a user selects a user interface 801 which is displayed along with pieces of contents in a service screen where the pieces of contents are displayed, it may be allowable, without a friend addition, to turn a mobile web into a talk window 800 which links a user messenger account with a business messenger account so that the user and the business operator may communicate regarding the underlying content (e.g., advertised product, etc.). During this, the talk window 800 may provide a one-time communication function capable of conducting a talk between the two accounts under the condition that there is no friendship between the user and the business operator.

In the meantime, as shown in FIG. 9, as a user interface 901 displayed on a mobile web is selected, information 910 about pieces of contents associated with the user interface 901 for which the user intends to make an inquiry from the business operator, may be put together during a switchover to a talk window 900. At the same time of providing the talk window 900 to link a user with a business operator on accounts, information 910 about pieces of contents selected by the user through the user interface 901 may be displayed to automatically contact the business operator with the pieces of contents which the user intends to discuss with the business operator. The information 910 about pieces of contents may include information displayed on a mobile web, or links movable to the mobile web where the pieces of contents are displayed.

FIG. 10 illustrates a messenger screen at the side of a business operator in accordance with an example embodiment.

Referring to FIG. 10, in such a business-side messenger, a talk window 1000 linking with a user account may be open to display information 1001 and 1002 for a user corresponding thereto. Specifically, before a user adds a corresponding business operator to his friend list, the user may be able to display user information in a certain name other than a real name or ID of the user, or in an extra ID 1001. As also, a profile image 1002 displayed along with the name or ID may be replaced with an extra image, which is not real information set by the user.

While the aforementioned is focused on a communication environment using a messaging function of a messenger, it may be permissible to support a free call environment between a user and a business operator as described above. In addition to a message chat, a user may request a wireless Internet call to a business operator through a user interface which is displayed along with pieces of contents, and a communication system may offer a service of call function between the user and the business operator in a messenger.

Figure 11:
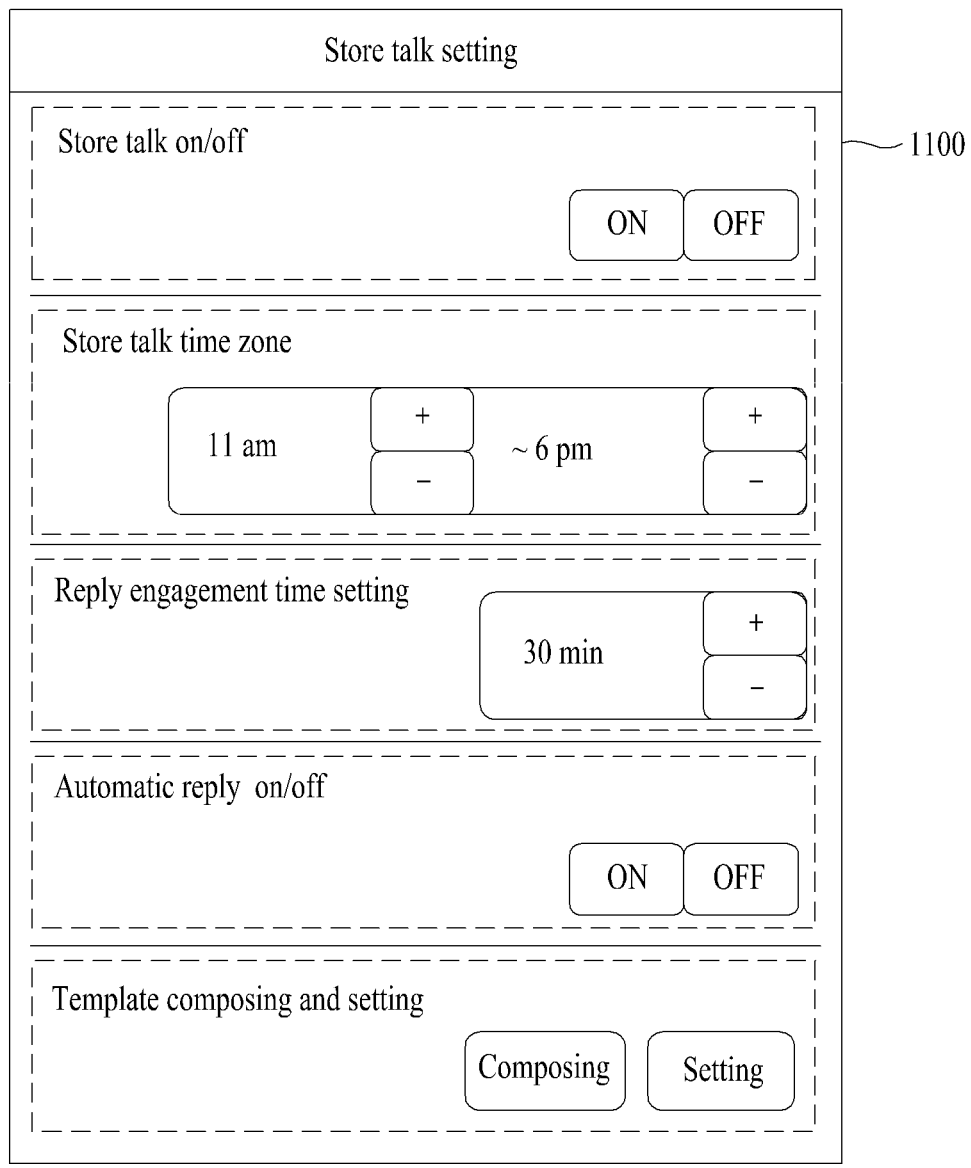
FIG. 11 illustrates a configuration for setting a store talk environment of a business operator in accordance with an example embodiment.

FIG. 11 illustrates an exemplary configuration for setting a store talk environment of a business operator in accordance with an example embodiment. FIG. 11 shows an environment setting screen 1100 of a store talk which is provided for a business operator.

The environment setting screen 1100 may include the functions for on/off setting a store talk, setting an available time zone of the store talk, setting a reply engagement time to a user message, setting whether to use an automatic reply function with a software bot, and preliminarily composing a message template and setting a reply with the preliminarily composed template.

In addition to the environment setting screen 1100 of the store talk, a business operator may register basic information and photographs in a CMS-based management screen to easily dress an account page on a messenger. The account page of the business operator may appear at an Internet search result through an external PC or smart phone, as well as at the messenger, and may be utilized for displaying or publicizing store information. While a detailed feature of the account page is not shown, a mobile messenger may provide a business operator with a management screen capable of inputting or setting introduction information (e.g., official site URL, telephone number, store introduction, profile image, map, etc.), various pieces of contents (e.g., product item, coupon, etc.), notifications, and so on.

A user interface for a store talk may be displayed on a mobile web along with pieces of contents for businesses which need services of reservation query, client management, product order, and estimation query. Examples of businesses that may need store talks are summarized in the table of FIG. 12.

According to such example embodiment, while searching pieces of contents through a mobile web, messenger accounts between a user and a business operator may be instantly linked to each other to unaffectedly induce a talk between the user and the business operator.

Figure 13:
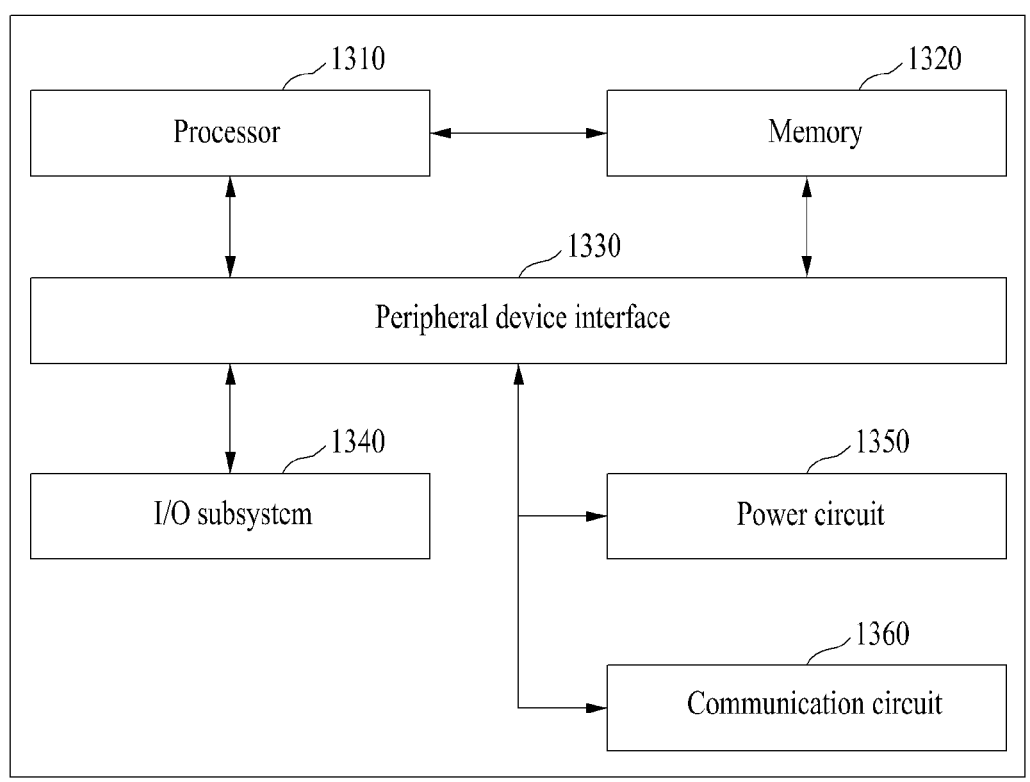
FIG. 13 is a block diagram illustrating an example of an internal configuration of a computer system in accordance with an example embodiment.

FIG. 13 is a block diagram illustrating an example of an internal configuration of a computer system in accordance with an example embodiment. The computer system 1300 may least include at least one processor 1310, a memory 1320, a peripheral interface 1330, an input/output subsystem 1340, a power circuit 1350, and a communication circuit 1360. In this configuration, the computer system 1300 may correspond to a user terminal and a business operator.

The memory 1320 may include, for example, a high-speed random access memory, a magnetic disk, an SRAM, a DRAM, a ROM, a flash memory, or a nonvolatile memory. The memory 1320 may include a software module, an instruction group, or other various data necessary for an operation of the computer system 1300. In this configuration, accessing the memory 1320 from a foreign component such as the processor 1310 or the peripheral interface 1330 may be controlled by the processor 1310.

The peripheral interface 1330 may couple input and/or output peripheral devices of the computer system 1300 with the processor 1310 and the memory 1320. The processor 1310 may execute software modules or instruction groups, which is stored in the memory 1320, to perform various functions and process data.

The input/output subsystem 1340 may couple a variety of input/output peripheral devices with the peripheral interface 1330. For instance, the input/output system 1340 may include a controller for coupling peripheral devices, such as a monitor, a keyboard, a mouse, printer, or in need, a touch screen, or a sensor, with the peripheral interface 1330. According to another embodiment, the input/output peripheral devices may be coupled with the peripheral interface 1330 without through the input/output subsystem 1340.

The power circuit 1350 may supply power entirely or partly to components of a terminal. For example, the power circuit 1350 may include a power management system, one or more power sources such as battery or AC source, a charging system, a power failure detection circuit, a power converter or inverter, a power state indicator, or other components for generating, managing, and distributing power.

The communication circuit 1360 may use at least one of external ports to allow communication with another computer system. Otherwise, as aforementioned, the communication circuit 1360 may include an RF circuit, in need, to transmit and receive an RF signal which is known as an electromagnetic signal, even allowing communication with another computer system.

This embodiment of in FIG. 13 is merely shown as an example of the computer system 1300. The computer system 1300 may be formed without a part of the components shown in FIG. 13, further comprised of an additional component which is not shown in FIG. 13, or formed to have a configuration or arrangement coupling two or more components. For example, a computer system for a communication terminal in a mobile environment may further include even a touch screen or sensor, or include a circuit for RF communication with various communication modes (WiFi, 3G, LTE, Bluetooth, NFC, Zigbee), in addition to the components shown in FIG. 13. Components includable in the computer system 1000 may be practiced in hardware including an integrated circuit specialized for application or process of one or more signals, software, or combinations with hardware and software.

While the content supply system (content provider) described with FIG. 1 is not illustrated by drawings in detail, the content supply system may basically include a processor, a bus, a network interface, and a memory, in which the memory may include an operating system and a service routine. Additionally, the processor may include an element for interacting with a communication system in accordance with the aforementioned descriptions through FIGS. 1 to 11.

FIGS. 3 to 5 and FIGS. 8 to 11 are example screens for helping to comprehend the inventive concept and for convenience of description. Those screens may be modified anyway in formation, or order.

Methods according to example embodiments may be implemented in a form of program instructions, which are executable through various types of computer systems/processors, and stored in a computer-readable medium.

A program (computer-readable program) according to an example embodiment may be made up of a PC-based program or an application for mobile terminal. A messenger app in such example embodiments may be implemented in a program operating independently, or an in-app of a specific application to allow an operation on the specific application.

Additionally, methods according to example embodiments may be performed with a messenger app to control a user terminal. An application therefor may be installed in a user terminal through a file distribution system. For example, the file distribution system may include (not shown) a file transmission part (not shown) sending a file in response to a request of a user terminal.

According to example embodiments, it may be accomplishable to build a new marketing model by providing a one-to-one communication channel between a user and a business operator through interaction between a mobile web service and a messenger service. Additionally, according to example embodiments, it may be allowable to provide a service environment in which user interface (UI) for communication between a user and a business operator on a mobile web service is displayed, in order to permit a direct talk between the user and the business operator.

The system described above may be implemented in hardware elements, at least one processor executing software elements, and/or combinations with hardware and software elements. For example, systems, devices, parts, and elements described in example embodiments may be implemented by one or more processing circuitry such as a processor, a controller, an Arithmetic Logic Unit (ALU), a digital signal processor, a microcomputer, a Field Programmable Gate Array (ALU), a Programmable Logic Unit (PLU), a microprocessor, or other unit capable of executing instructions and responding thereto. A processing unit may perform an Operating System (OS) and one or more software applications which are executed on the OS. Additionally, a processing unit may respond execution of software to even access, store, control, process, and generate data. While a processing unit is even described as operating with one member for convenience of understanding, it can be seen by those skilled in the art that the processing unit may include a plurality of processing elements and/or plural types of processing elements. For example, a processing unit may include a plurality of processors, or one processor and one controller. It may be permissible to form another processing configuration such as parallel processor.

The software may include computer programs, codes, instructions, or a combination with one or more of them, and configure or control, independently or collectively, a processing unit to operate in a desired direction. For analyzing by a processing unit and providing instructions or data to the processing unit, soft and/or data may be embodied permanently or temporarily in some machines, components, physical devices, virtual equipment, or transmitted signal waves. Software may be distributed over a computer system, which is connected with a network, and even stored or executed in the distribution mode. Software and data may be stored in one or more computer-readable recording medium.

A method according to embodiments of the inventive concept may be implemented in a form of program instruction, which is executable through a variety of processing circuitry, and recorded in a computer-readable medium. The computer-readable medium may independently or collectively include program instructions, data files, data structures, and so on. Program instructions recorded in such a medium may be especially designed and configured for embodiments of the inventive concept, but they may be also used even by those skilled in the computer software art. A computer-readable recording medium may include a hardware unit, which is specialized to store and execute program instructions, for example, magnetic medium such as hard disk, floppy disk, or magnetic tape, optical medium such CD-ROM or DVD, magneto-optical medium such as floptical disk, and memory such as ROM, RAM, and flash memory. Program instructions may include high-class language codes, which are executable by a computer with an interpreter, as well as machine language codes made likely by a compiler. The hardware unit may be formed to operate as one or more modules or unit for performing the operations according to example embodiments, and the reverse is also same.

While the inventive concept has been described with reference to example embodiments, it will be apparent to those skilled in the art that various changes and modifications may be made without departing from the spirit and scope of the inventive concept set forth throughout the annexed claim matters. For example, although the aforementioned technical features are carried out in other sequences different from the manners described above, and/or the aforementioned elements, such as systems, structure, devices, and circuits, are combined or associated each other in other forms different from the described above, or replaced or substituted with other elements or equivalents, advantageous effects according to the inventive concept may be accomplished without further endeavors.

Therefore, it should be understood that the above embodiments are not limiting, but illustrative, hence all technical things within the annexed claims and the equivalents thereof may be construed as properly belonging to the territory of the inventive concept.

What is claimed is:

1. An online communication method performed by a computer, the method comprising:
    receiving, by at least one processor, a selection instruction from at least one user terminal associated with a user, the selection instruction including information related to content provided by a content provider on a website;
    determining, by the at least one processor, a business operator relevant to the content based on the received selection instruction from a plurality of business operators;
    establishing, by the at least one processor, an online communication link between a first account of the user associated with a messenger service via the at least one user terminal, the first account being previously registered with the messenger service, and a second account associated with the determined business operator;
    generating, by the al least one processor, a talk window associated with the messenger service, the talk window configured to permit message transmission and reception between the first account and the second account based on the selection instruction, without a relationship being established between the first and second accounts, and messenger service settings associated with the user, the generating including,
  anonymously processing personal information of the user associated with the first account by replacing the personal information of the user with arbitrary information to be displayed at a terminal associated with the second account when no relationship has been established between the first and second accounts and the messenger service settings indicate that the personal information of the user associated with the first account is set to private;
monitoring, by the at least one processor, a reply rate of the business operator to a message sent via the first account in the talk window;
determining, by the at least one processor, the reply rate based on an average reply time taken by the business operator to reply to messages sent via the first account and a total reply rate of the business operator for replying to messages sent by all users;
determining, by the al least one processor, whether to display a user interface along with the content on a service screen provided by the content provider to enable a messenger call based on the reply rate; and
displaying, by the at least one processor, the user interface based on results of the determining whether to display the user interface.

2. The communication method of claim 1, wherein the establishing the online communication link comprises:
  transmitting the online communication link corresponding to a communication function selected in a selection menu for selecting one of a plurality of communication functions,
    the plurality of communication functions including a call function enabling a wireless Internet-based voice communication between the first account and the second account, and a messaging function enabling an exchange of messages between the first account and the second account.

3. The communication method of claim 1, wherein the establishing the online communication link comprises:
  transmitting the online communication link using a function of initiating a call via the messenger service between the first account and the second account and a function of transmitting the information related to the content to the second account via the messenger service are provided by the selection instruction via a user interface displayed along with the content on a service screen provided by the content provider.

4. The communication method of claim 1, wherein the establishing the online communication link comprises:
  receiving information associated with the content from the content provider, and automatically linking the information with the talk window at the same time of generating the talk window.

5. The communication method of claim 1, wherein the establishing the online communication link comprises:
  providing one of a function that uses a software bot for the business operator in the talk window, and a function that uses a message template to reply automatically or selectively to a message sent via the first account.

6. The communication method of claim 1, wherein the establishing the online communication link comprises:
  determining to activate the talk window set by the business operator based on at least one of a use of the talk window and a use time zone associated with the talk window.

7. The communication method of claim 1, wherein the establishing the online communication link comprises:
  providing promotional information regarding the content, to the first account through the talk window if a relationship is established between the first account and the second account.

8. The communication method of claim 1, further comprising:
  managing, by the at least one processor, the talk window.

9. The communication method of claim 8, wherein the managing the talk window comprises:
  terminating the online communication link between the first account and the second account when at least one of,
    a time lapses after generating the talk window,
    a message in not exchanged between the first account and the second account after an exchange of a currently existing final message in the talk window, and
    the talk window is terminated via at least one of the first account and the second account.

10. The communication method of claim 9, wherein the managing the talk window comprises:
  maintaining a communication record through the talk window without terminating the online communication link between the first account and the second account if a relationship is set between the first account and the second account.

11. The communication method of claim 1, wherein the monitoring the reply rate of the business operator comprises:
  determining as the reply rate, a rate with which the business operator, via the second account, replies over a time period to messages sent by all users.

12. The communication method of claim 1, wherein the reply rate is used as a reference to provide at least one of compensation or a penalty to the business operator.

13. A content display method performed by a computer, the method comprising:
  displaying, by at least one processor, at least one content on a service screen provided by a content provider; and
  displaying, by the at least one processor, with the at least one content, a user interface associated with the at least one content for enabling a messenger call via a messenger service,
  wherein if the user interface is selected by a user, the method further includes,
    receiving a selection instruction from at least one user terminal associated with the user, the selection instruction including information related to the at least one content,
    determining a business operator relevant to the at least one content based on the received selection instruction from a plurality of business operators,
    establishing an online communication link between a user messenger account on the messenger service associated with the user and a business messenger account associated with the determined business operator,
    generating a talk window associated with the messenger service, the talk window configured to permit message transmission and reception between the user messenger account and the business messenger account based on the selection instruction, without a relationship being established between the user messenger account and the business messenger account, and messenger service settings associated with the user, the generating including, anonymously processing personal information of the user associated with the user messenger account by replacing the personal information of the user with arbitrary information to be displayed at a terminal associated with the business messenger account when no relationship has been established between the user messenger account and the business messenger account and the messenger service settings indicate that the personal information of the user associated with the user messenger account is set to private, monitoring a reply rate of the business messenger account to a message sent via the user messenger account in the talk window, determining the reply rate based on an average reply time taken by the business messenger account to reply to messages sent via the user messenger account and a total reply rate of the business messenger account for replying to messages sent by all users, determining whether to continue to display the user interface along with the content on the service screen provided by the content provider to enable the messenger call based on the reply rate; and displaying or not displaying the user interface based on results of the determining whether to display the user interface.

14. The content display method of claim 13, wherein the establishing the online communication link further comprises:

a messaging function capable of performing a call function capable of performing a wireless Internet-based voice communication between the user messenger account and the business messenger account.

15. The content display method of claim 13, wherein the establishing the online communication link further comprises:

providing a function of initiating a call via the messenger service between the user messenger account and the business messenger account and a function of transmitting the information related to the at least one content to the business messenger account via the messenger service in response to the selection of the user interface.

16. The content display method of claim 15, wherein the establishing the online communication link further comprises:

transmitting information regarding the content to the user messenger account in response to the selection of the user interface.

17. The content display method of claim 13, further comprising:

managing a list of business categories associated with the plurality of business operators, each of the plurality of business operators capable of communicating content with the user messenger account; and the displaying of the user interface comprises excluding content, associated with a business operator from the plurality of business operators that is not the determined business operator, from being displayed on the user interface.

18. The content display method of claim 13, wherein the establishing the online communication link further comprises:

managing a reply rate of a business operator associated with the business messenger account; and the displaying of the user interface comprises excluding content associated with the determined business operator based on the reply rate from being displayed on the user interface.

19. A non-transitory computer-readable medium storing computer readable instructions, which when executed by at least one processor, cause the at least one processor to:

receive a selection instruction from at least one user terminal associated with a user, the selection instruction including information related to content provided by a content provider on a website;

determine a business operator relevant to the content based on the received selection instruction from a plurality of business operators;

establish an online communication link between a first account of the user associated with a messenger service via the at least one user terminal, the first account being previously registered with the messenger service, and a second account associated with the determined business operator;

generate a talk window associated with the messenger service, the talk window configured to permit message transmission and reception between the first account and the second account based on the selection instruction, without a relationship being established between the first and second accounts, and messenger service privacy settings associated with the user, the generating including, anonymously processing personal information of the user associated with the first account by replacing the personal information of the user with arbitrary information to be displayed at a terminal associated with the second account when no relationship has been established between the first and second accounts and the messenger service settings indicate that the personal information of the user associated with the first account is set to private;

monitor a reply rate of the business operator to a message sent via the first account in the talk window;

determine the reply rate based on an average reply time taken by the business operator to reply to messages sent via the first account and a total reply rate of the business operator for replying to messages sent by all users;

determine whether to display a user interface along with the content on a service screen provided by the content provider to enable a messenger call based on the reply rate; and display the user interface based on results of the determining whether to display the user interface.

* * * * *